C. H. EASTMAN.
PONY CAR.
APPLICATION FILED MAR. 26, 1917.
1,302,779.
Patented May 6, 1919.
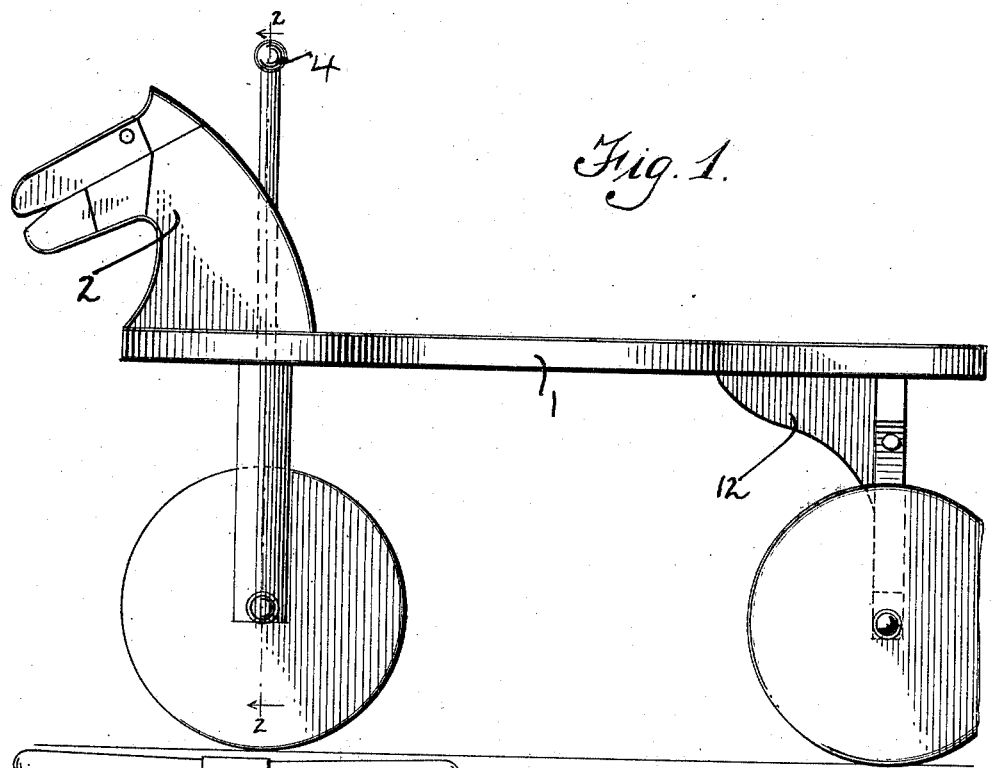
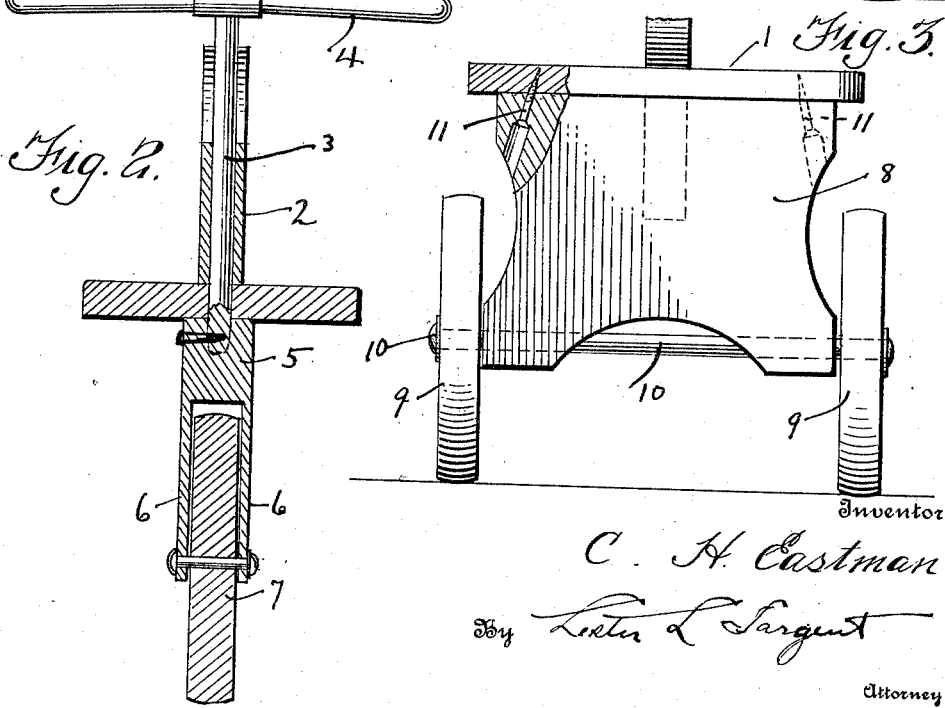
Inventor
C. H. Eastman
By Lester L. Sargent
Attorney

UNITED STATES PATENT OFFICE.

CHARLES H. EASTMAN, OF UNION CITY, PENNSYLVANIA, ASSIGNOR TO FRANK EASTMAN, OF UNION CITY, PENNSYLVANIA.

PONY-CAR.

1,302,779.     Specification of Letters Patent.     Patented May 6, 1919.

Application filed March 26, 1917. Serial No. 157,563.

*To all whom it may concern:*

Be it known that I, CHARLES H. EASTMAN, a citizen of the United States, and a resident of Union City, in the county of Erie and State of Pennsylvania, have invented a new and useful Pony-Car, of which the following is a specification.

The object of my invention is to provide a novel and improved type of foot-propelled vehicle for children. It is an especial object to provide on such a vehicle a rigid flat-sided member, through which the steering member extends, whereby a figure vehicle is provided in which the figure head does not interfere with the steering of the vehicle. It is further my object to provide improved means for mounting the vehicle.

I attain these objects by the mechanism illustrated in the accompanying drawing, in which—

Figure 1 is a side elevation of the invention; Fig. 2 is a vertical section on line 2—2 of Fig. 1; and Fig. 3 is a view of the rear portion of the vehicle, partly in section.

Similar numerals refer to similar parts throughout the several views.

Referring to the accompanying drawings, I provide a body 1 to which is secured a flat sided member 2 at the forward end, shaped in the form of an animal's head. Rotatably mounted in member 2 and extending vertically through it I provide a steering post 3 to the upper end of which is affixed a suitable steering member 4, and to the lower end of which is affixed or integrally secured an enlarged post 5 having arms 6 to which the front wheel 7 is mounted. The rear portion of the body is supported by a flat brace member 8 arranged transversely of the vehicle body 1 and to the lower portion of which rear wheels 9 are mounted by means of a suitable axle 10, as shown in Fig. 3. The member 8 is preferably shaped as shown and is rigidly secured to the vehicle body 1 by means of screws 11 and by a suitable angular central brace 12 which may be positioned either forward of or back of the member 8.

What I claim is:

1. In a child's vehicle the combination of a flat body member, a rear wheel support for the body member, a centrally disposed steering wheel, a vertically disposed steering post having the portion thereof below the body member of relatively larger diameter to provide a support for the body member, handle bars attached to the upper portion of the steering post, and an ornamental flat-sided figure-head rigidly secured to the upper portion of the forward end of the said body member having an opening through which the upper portion of the steering post extends to increase the rigidity of the steering post and to lessen the liability of its becoming broken.

2. In a child's vehicle of the type described, the combination of a flat body member, a rear wheel support, a front steering wheel, a relatively large steering post member supporting the body member and to which the steering wheel is attached, a flat-sided figure-head member rigidly attached to the body member over the steering post, the steering post having an extension passing through the flat body member and through the flat figure-head member to lessen the liability of the steering post becoming broken, and handle bars on the steering post.

CHARLES H. EASTMAN.

Copies of this patent may be obtained for five cents each, by addressing the "Commissioner of Patents, Washington, D. C."